US012801898B2

(12) United States Patent
Yu et al.

(10) Patent No.: US 12,801,898 B2
(45) Date of Patent: Nov. 17, 2026

(54) TILE PROCESSING FOR CONVOLUTIONAL DENOISING NETWORK

(71) Applicant: ADVANCED MICRO DEVICES, INC., Santa Clara, CA (US)

(72) Inventors: Insu Yu, Blacksburg, VA (US); Wojciech Uss, Warsaw (PL)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 299 days.

(21) Appl. No.: 18/374,172

(22) Filed: Sep. 28, 2023

(65) Prior Publication Data

US 2024/0265507 A1 Aug. 8, 2024

Related U.S. Application Data

(60) Provisional application No. 63/443,664, filed on Feb. 6, 2023.

(51) Int. Cl.
*G06N 3/0464* (2023.01)
*G06T 5/70* (2024.01)

(52) U.S. Cl.
CPC ............. *G06N 3/0464* (2023.01); *G06T 5/70* (2024.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,836,853 | B1 | 12/2017 | Medioni |
| 10,185,891 | B1 | 1/2019 | Martin |
| 2018/0033144 | A1 | 2/2018 | Risman et al. |
| 2018/0157961 | A1 | 6/2018 | Henry et al. |
| 2018/0165543 | A1 | 6/2018 | Mody et al. |
| 2018/0296281 | A1 | 10/2018 | Yeung et al. |
| 2019/0130573 | A1 | 5/2019 | Xu et al. |
| 2019/0213473 | A1 | 7/2019 | Dutta et al. |
| 2019/0251442 | A1 | 8/2019 | Koivisto et al. |
| 2020/0042871 | A1 | 2/2020 | Francini et al. |
| 2020/0176056 | A1 | 6/2020 | Luna |

(Continued)

FOREIGN PATENT DOCUMENTS

| | | | | |
|---|---|---|---|---|
| CN | 104301584 A | * | 1/2015 | ............. H04N 25/00 |
| CN | 107730464 A | * | 2/2018 | ............... G06T 1/20 |

(Continued)

OTHER PUBLICATIONS

Thomas et al. "A Reduced-Precision Network for Image Reconstruction," ACM Trans. Graph., vol. 39, No. 6, Article 231, 2020, 12 pages.

(Continued)

*Primary Examiner* — David Ometz

(57) ABSTRACT

Techniques are described for denoising an input image using a tiled convolutional neural network (CNN). Input image data is segmented into a plurality of input tiles, each of which is processed using a respective thread group. Each thread group employs a U-Net structure comprising encoding stages, decoding stages, and a bottleneck stage, to generate corresponding output tiles. A set of core pixels is extracted from each padded output tile and used to generate a denoised output image using the extracted core pixels.

20 Claims, 10 Drawing Sheets

(56) References Cited

U.S. PATENT DOCUMENTS

| | | | |
|---|---|---|---|
| 2020/0234116 | A1 | 7/2020 | Valpola |
| 2020/0280717 | A1 | 9/2020 | Li et al. |
| 2020/0293813 | A1 | 9/2020 | Shibata |

FOREIGN PATENT DOCUMENTS

| | | | | | |
|---|---|---|---|---|---|
| CN | 106663315 | B | * | 7/2020 | ............. G06V 10/50 |
| CN | 113890961 | A | * | 1/2022 | ............. H04N 23/57 |
| EP | 3330900 | B1 | | 6/2018 | |
| GB | 2605667 | A | * | 10/2022 | ............. G06T 11/00 |
| WO | 2017091833 | A1 | | 6/2017 | |
| WO | 2018111918 | A1 | | 6/2018 | |
| WO | WO-2018218249 | A1 | * | 11/2018 | ............. G06T 9/002 |

OTHER PUBLICATIONS

U.S. Appl. No. 18/374,100, filed Sep. 28, 2023, listing Insu Yu et al. as Inventors, Entitled "Inference Kernel Optimization in Convolutional Networks".

Non-Final Office Action mailed Apr. 8, 2026 for U.S. Appl. No. 18/374,100, 10 pages.

* cited by examiner

200

| GROUP NAME | BLOCK NAME | MEAN (us) | MEDIAN (us) | Stddev (us) | TOTAL (%) | GROUP (%) |
|---|---|---|---|---|---|---|
| DOWNSAMPLE (260) | DS 165 | 33 | 31 | 9 | 1% | 2% |
| | DS 170 | 8 | 8 | 1 | 0% | |
| | DS 175 | 2 | 2 | 0 | 0% | |
| ENCODER (220) | ENC 120 | 729 | 717 | 160 | 26% | 57% |
| | ENC 125 | 401 | 393 | 91 | 15% | |
| | ENC 130 | 262 | 258 | 54 | 10% | |
| | BN 135 | 165 | 162 | 26 | 6% | |
| DECODER (240) | DEC 140 | 142 | 140 | 23 | 5% | 34% |
| | DEC 145 | 318 | 314 | 52 | 12% | |
| | DEC 150 | 464 | 459 | 57 | 17% | |
| FILTER (280) | F0 180 | 8 | 5 | 24 | 0% | 8% |
| | USF 185 | 14 | 13 | 14 | 0% | |
| | USF 190 | 42 | 41 | 4 | 2% | |
| | USF 195 | 166 | 162 | 30 | 6% | |

FIG. 2

TILE PROCESSING FOR CONVOLUTIONAL DENOISING NETWORK

BACKGROUND

The advent of deep learning and the broad application of Convolutional Neural Networks (CNNs) have led to significant advances in the field of image processing, particularly for tasks such as denoising. Denoising is a critical process in the domain of image and video processing, as it aids in the enhancement of visual data by removing unwanted noise while preserving the essential details of the content.

However, many denoising approaches face a significant challenge when processing high-resolution image data due to the large volume of data associated with such images, often resulting in substantial read/write bandwidth issues. This is because the high-resolution input necessitates frequent storing and reading of data to and from global memory during computation, which leads to inefficient use of computational resources and increased processing times.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 2 illustrates profiling data gathered during denoising operations performed by embodiments of one or more CNN models.

DETAILED DESCRIPTION

Figure 1:
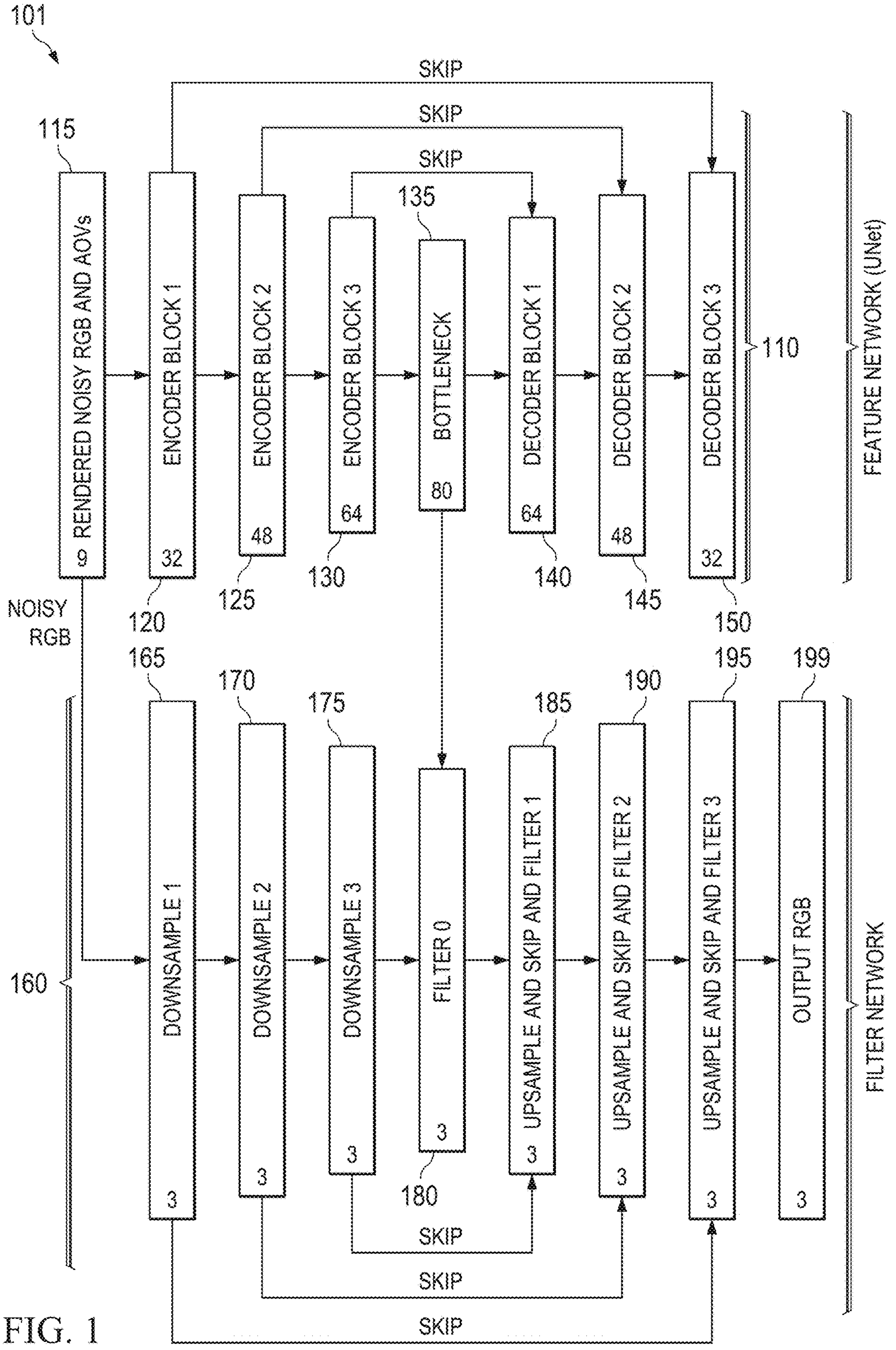
FIG. 1 depicts an example configuration of a denoising Convolutional Neural Network (CNN).

Certain denoising techniques involve the use of U-Nets, a specific type of CNN architecture. As used herein, a U-Net refers to a type of CNN configuration structured with an encoder-decoder architecture, in which input data is successively encoded to a compressed representation and then decoded back to an output of the original input dimension. The U-Net architecture may also include one or more skip connections linking layers in the encoder path to corresponding layers in the decoder path. Such skip connections serve to provide localized information to the decoder part of the network. U-Nets have been employed for denoising tasks due to their ability to efficiently encode and decode image data, such as high-resolution photographs or video frames, thereby capturing and preserving important features while eliminating noise. However, as noted above, the large volume of data associated with high-resolution images is often associated with substantial read/write bandwidth issues during denoising operations resulting from frequent storing and reading of data to and from global memory.

Embodiments of techniques described herein provide methods, devices, and systems for denoising image data by leveraging a CNN model configured to provide improved system memory usage and computational efficiency. In particular, in certain embodiments a denoising CNN is provided to address high read/write bandwidth requirement associated with the processing of full high-definition (HD) input data by processing input data as a segmented plurality of tiles, thereby reducing the requirement to store and read data from the global system memory during computation. In various embodiments, such a tiled denoising CNN performs denoising operations on input image data such as high-resolution photographs or captured/rendered video frames. For example, in certain embodiments input to the CNN comprises full HD noisy color, albedo (the base color of a surface without lighting and shadowing effects), and normal (the direction that a surface is facing at each pixel) data. The output from the CNN comprises a denoised color image of full HD resolution.

In various embodiments, input image data is partitioned into smaller segments referred to herein as core tiles for processing. For example, in one embodiment, these core tiles are defined as regions comprising 8×8 pixels. Adjacent pixel data is added as a padding around these core tiles, which aids in the subsequent computation. In certain embodiments, reflective padding (in which the padding data comprises image data reflected from the core tile) is used for those core tiles that are along the edge of the image. Processing in this tiled manner enables more efficient usage of local shared memory and produces the dependence on system memory bandwidth. Once processed, the center core tiles are extracted from the output tiles, and these are assembled together to form the final output image.

In this manner, embodiments of techniques described herein allow for high parallelization of computation, thereby improving the speed and efficiency of the denoising task and significantly mitigating read/write bandwidth issues encountered by previous approaches.

FIG. 1 depicts an example configuration of a denoising Convolutional Neural Network (CNN) 101, which in the depicted example includes a feature network 110 in a U-Net configuration and a filter network 160. The CNN 101 is generally configured to process input data 115 to extract and learn features and filters for that input data, thereby reducing the noise in output red-green-blue (RGB) information data 199. It accomplishes this through a series of encoding, decoding, downsampling, filtering, and upsampling operations, utilizing skip connections to preserve high-frequency details. Each skip connection is a direct path for transmitting information from earlier to later layers in the network, bypassing intermediate layers.

The feature network 110 is responsible for extracting features from input data 115, which represents an input image (e.g., rendered or captured video frame or other image). The input data 115 includes rendered/captured noisy RGB data and, in various scenarios and implementations, additional Arbitrary Output Variables (AOVs). AOVs are auxiliary data points captured during the rendering of a 3D scene to allow enhanced control over post-processing operations, adjustments, and overall scene refinement. In various scenarios, examples of AOVs may include information indicating one or more of depth, normals, albedo, diffuse and specular contributions, indirect lighting, object or material IDs, motion vectors, etc.

Operations of the example CNN 101 generally involve input data 115 being provided to and processed by a series of encoder blocks 120, 125, 130 and a bottleneck 135, and subsequently reconstructed by a series of decoder blocks 140, 145, 150. As used herein, a block refers to a functional component or unit of the neural network, which is configured to perform a specific set of operations on input data. Each block is characterized by its function within the architecture of the incorporating CNN and the unique operations it executes to transform the input data, and is implemented using a combination of hardware and software within a processing system. Each block includes underlying circuitry (either exclusive to a particular block or shared between multiple such blocks) that facilitates the operations of a particular block. In various embodiments, such circuitry may comprise one or more processor cores within a central processing unit (CPU), compute units within a graphics processing unit (GPU), or parallel processors, as a non-limiting examples. This circuitry can be programmed or configured to carry out the sequence of data manipulations defined by the block's function. The specific configuration of the circuitry, as well as the programming or instructions that govern its operation, are determined by the function of the block within the CNN and the specific operations it is designed to execute.

For example, circuitry of an encoding block within a U-Net configured CNN (or portion thereof) is configured to perform a series of convolutional and pooling operations to downsample input data, extracting and condensing feature information in the process. The circuitry that implements this block is configured to carry out the specific mathematical operations involved in convolution and pooling on the input data. In contrast, circuitry of a decoding block is configured to perform upsampling on condensed feature information, often through a combination of convolutional operations and concatenation with higher-resolution feature data from the encoding path. This effectively reconstructs the feature information at the original input resolution, with noise reduced or eliminated. The circuitry implementing the decoding block is configured to perform these upsampling and concatenation operations.

Continuing the example of FIG. 1, the first encoder block 120 accepts input data 115 and conducts various operations to extract high-level features from data 115. For example, in certain implementations such operations include one or more of conversion to grayscale and/or gradient magnitude computation, the outputs of which are concatenated and form the input for a first convolution layer. The encoder block 120 typically includes multiple convolution layers, followed by batch normalization and Exponential Linear Unit (ELU) activation and/or downsampling operation, such as via max pooling.

As used herein, a channel or feature map (used interchangeably herein) for a given block indicates the depth of its output tensor, and corresponds to an individual outcome generated by a specific operation or set of operations applied by the block. In the example of FIG. 1, each of the encoder blocks 120, 125, 130, bottleneck 135, decoder blocks 140, 145, 150, downsample blocks 165, 170, 175, and filter blocks 180, 185, 190, 195 include an indication of a number of channels or feature maps present at that specific stage in the CNN 101. For example, encoder block 120 indicates a 32-channel output; encoder block 125 indicates a 48-channel output; etc. The progression in the number of channels within successive blocks of the feature network 110 is representative of the increasing complexity of patterns that the CNN 101 is designed to capture from the input data 115 as it advances through the CNN 101. Hence, each block within the CNN 101 operates with a varying number of channels to enable the capture of increasingly intricate features in the input data throughout the network's progression.

The output of the first encoder block 120 is provided to the second encoder block 125, which performs additional operations on the input from encoder block 120 and provides its output to the third encoder block 130. The encoder blocks 120, 125, 130 progressively downsample the input image data 115, enabling network 110 to learn hierarchical features included therein.

The output of the third encoder block 130 feeds into the bottleneck 135, which processes the encoded features received from encoder block 130 without changing their dimensions. The bottleneck 135 is similar to each of encoder blocks 120, 125, 130, but excludes max pooling operations and skip connections. The primary purpose of the bottleneck 135 is to encode the most relevant features of the input data 115.

The first decoder block 140 accepts the output from the bottleneck 135 and begins the process of upsampling and refining the features contained therein, guided by the information from the corresponding encoder block 130 via a skip connection. The second decoder block 145 and the third decoder block 150 operate similarly, each receiving output from both the preceding decoder block and (via additional skip connections) the corresponding encoder block. In this manner, the decoder blocks 140, 145, 150 reconstruct the image data at the original scale.

The filter network 160, executing in parallel to the feature network 110, includes a series of downsample blocks 165, 170, 175. The first downsample block 165 accepts the original input data 115 and provides output to the second downsample block 170. The second downsample block 170, in turn, feeds the third downsample block 175. These blocks 165, 170, 175 progressively reduce the resolution of input data 115, forming a compressed feature map.

This compressed feature map, along with the output from the bottleneck 135, are input to the filter 0 block 180, which provides output to a series of upsample/skip/filter (USF) blocks 185, 190, 195. Each of USF blocks 185, 190, 195 implement a combination of upsampling, skip connection, and filtering operations.

In particular, in the example of FIG. 1 USF block 185 receives input from filter block 180 and decoder block 140. The USF block 185 upsamples the output from filter block 180 (increasing the resolution of the data), and concurrently incorporates data from decoder block 140 via their shared skip connection.

USF block 190 operates in a similar manner, receiving inputs from block 185 and decoder block 145. In particular, USF block 190 upsamples the data from block 185 and integrates the data from decoder block 145 via skip connection. In a manner similar to that described above with respect to USF block 185, the upsampling operation of USF block 190 is performed to enhance the spatial resolution of the output data from block 185, while the skip connection allows for the inclusion of information-rich features from decoder block 145.

USF block 195 receives inputs from block 190 and decoder block 150. It performs similar operations as blocks 185 and 190, upsampling the data from block 190 and integrating data from decoder block 150 via skip connection. The resulting output RGB data 199 has been processed through all stages of the CNN 101, progressively denoised and enhanced in resolution with the inclusion of high-level feature information from the decoder blocks 140, 145, 150.

Figure 10:
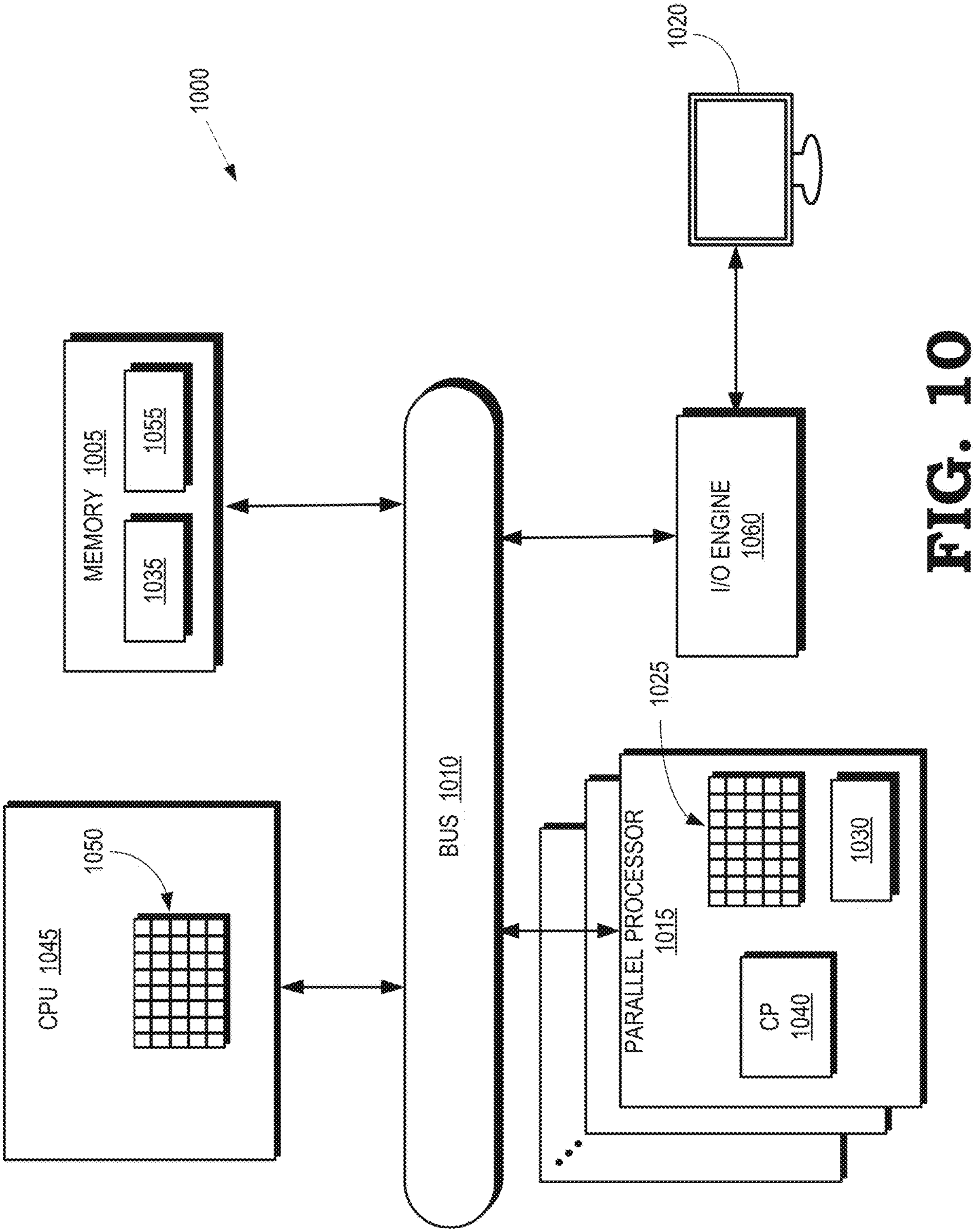
FIG. 10 is a block diagram of a processing system designed to implement a tiled denoising CNN, in accordance with one or more embodiments.

As noted elsewhere herein, in reference to a denoising Convolutional Neural Network (CNN) 101 as depicted in FIG. 1, a multitude of operations of the denoising CNN 101 involve read and write interactions with global system memory (e.g., system memory 1005 of FIG. 10, described elsewhere herein). In particular, such interactions may occur at the following stages:

- Initial data loading: The loading of input data 115, which includes Rendered Noisy RGB and Arbitrary Output Variables (AOVs), involves a read operation from the global system memory. This operation allows the CNN 101 to acquire the necessary data for subsequent processing.
- Encoder blocks: Each of the encoder blocks 120, 125, and 130 utilize read and write operations to and from the global system memory, such as during the convolutional and max pooling stages to accommodate intermediate results or shared kernel parameters.
- Bottleneck: The bottleneck block 135 utilizes read and write operations from the global system memory to handle intermediate results and maintain kernel parameters during its convolutional operations.
- Decoder blocks: Similar to the encoder blocks, each of the decoder blocks 140, 145, and 150 typically utilizes read and write operations to and from the global system memory, such as to process intermediate results and share kernel parameters during the convolutional and upscaling stages.
- Feature extraction: The filter network 160, including the downsampling blocks 165, 170, and 175, the filter 180, and the upsample/skip/filter blocks 185, 190, and 195, may necessitate read and write operations to and from the global system memory. These operations are utilized for data transformation during the downsampling and upsampling stages and during filter operations for feature extraction.
- Final data output: providing output of the CNN 101 utilizes a write operation to the global system memory, storing the denoised image data for subsequent utilization or analysis.

Thus, multiple stages of the denoising CNN 101 utilize read and write interactions with the global system memory, which can impose significant demand on system memory bandwidth when processing high-resolution image data.

FIG. 2 illustrates profiling data 200 gathered during denoising operations performed by embodiments of CNN models similar to that described above with respect to CNN 101. The profiling data 200 includes statistical information regarding execution time (in microseconds) associated with individual operation types as executed by those CNN models. As seen via the illustrated profiling data 200, approximately 91% of the associated computation and memory bandwidth is associated with operations of the feature network 110, with 57% associated with encoder operations 220 (operations performed by encoder blocks 120, 125, 130 and bottleneck 135) and 34% associated with decoder operations 240 (operations performed by decoder blocks 140, 145, 150). The remaining bandwidth was split between the downsample operations 260 (2%) and filtering operations 280 (8%).

Figure 3:
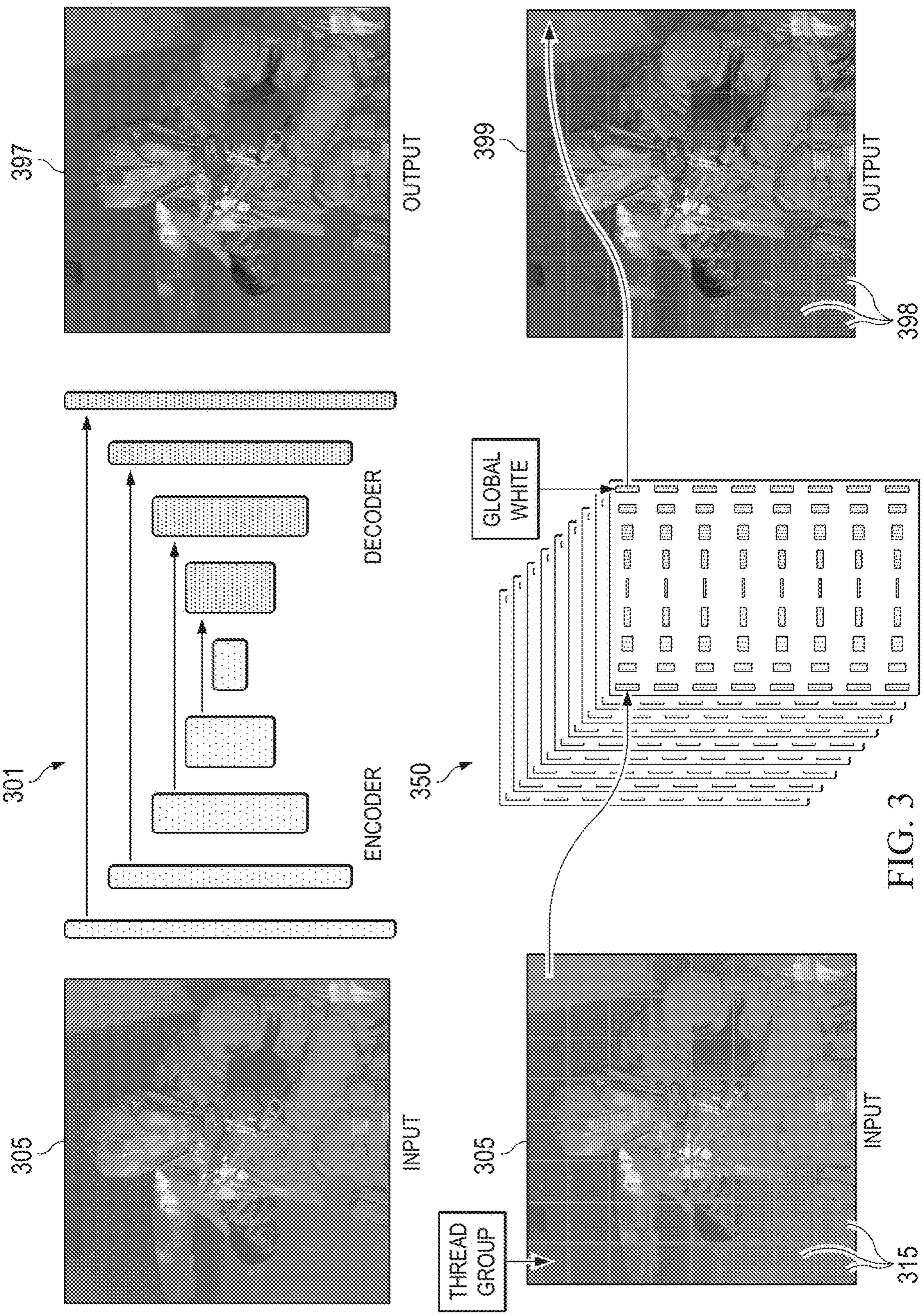
FIG. 3 illustrates two contrasting methodologies for the denoising of an input image utilizing a tiled U-Net configured convolutional neural network, in accordance with some embodiments.

FIG. 3 illustrates two contrasting methodologies for the denoising of an input image 305 utilizing a U-Net configured convolutional neural network. In the first scenario, the single input image 305 is directly processed by a feature network 301. In the second scenario, the input image 305 is segmented into multiple input tiles 315 and fed to a plurality of feature networks 350 in accordance with embodiments of techniques described herein.

In the first scenario, an input image 305 (representing a noisy photograph or video frame) is provided as input to a feature network 301. The feature network 301, configured in accordance with a U-Net architecture, processes the entire image 305 as a single entity. It includes multiple encoder and decoder blocks (not separately referenced in the context of FIG. 3) to extract features from the input image 305 and thereby generate a denoised output image 397. As noted elsewhere herein, each of the encoder and decoder stages of the feature network 301 is associated with one or more read/write operations to/from local system memory (not shown).

In contrast, in the second scenario the original input image 305 is segmented into a plurality of smaller input tiles 315 that each correspond to a thread group, such that each input tile 315 is assigned to a respective thread group. In this arrangement, every thread group is responsible for processing a single input tile 315 within its corresponding feature network 350. This allows for parallel computation, as multiple thread groups can operate simultaneously on different portions of the image data. Each of the input tiles 315 is fed into a respective one of feature networks 350, each also configured in accordance with a U-Net architecture, for individual processing. In certain embodiments, each of the U-Net configured feature networks 350 may be substantially identical in their operation and structure. The processed tiles are output as denoised output tiles 398, which are subsequently reassembled to form the denoised output image 399.

Figure 4:
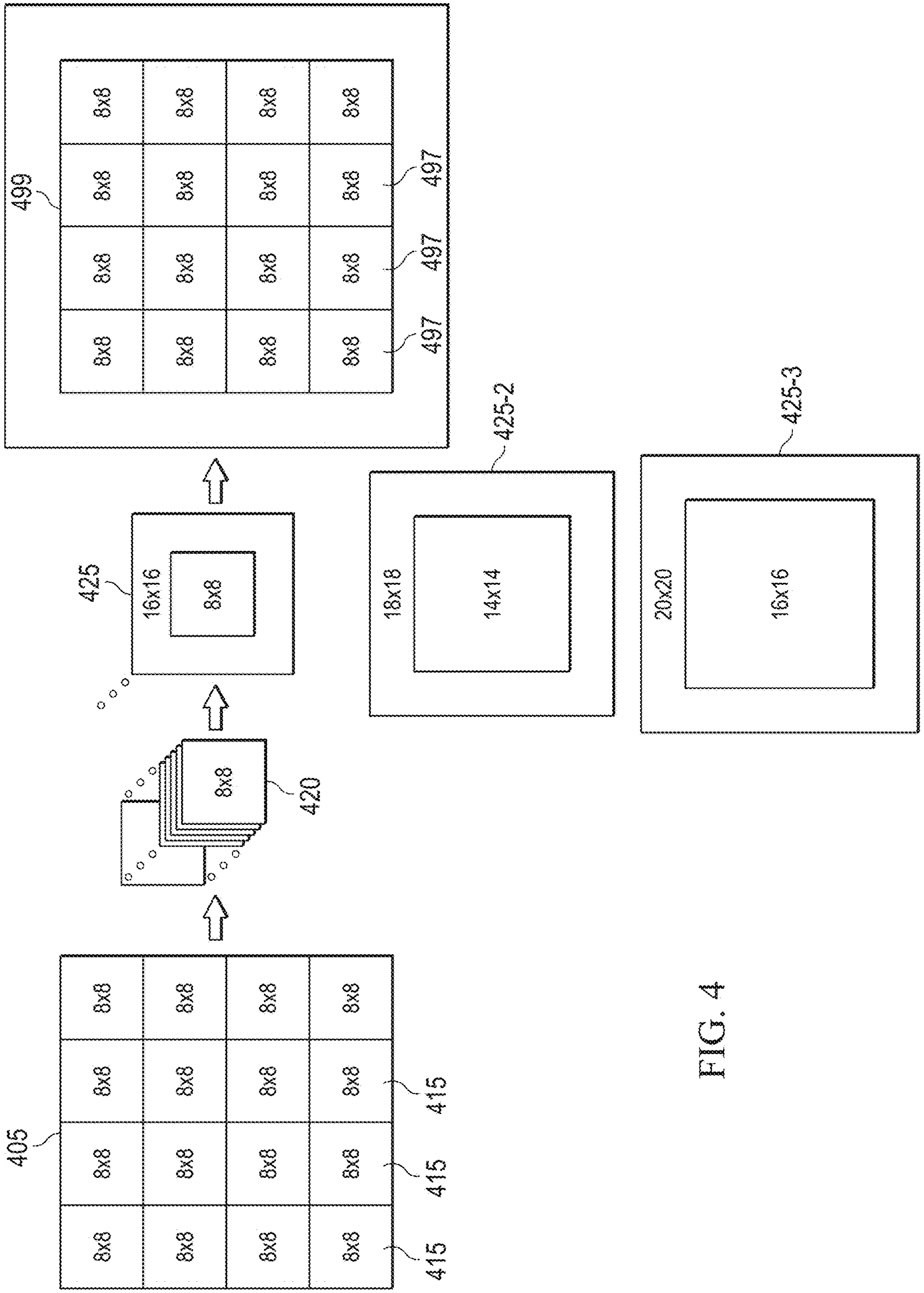
FIG. 4 illustrates tiling operations involved in processing (denoising) a high-resolution input image, in accordance with one or more embodiments.

FIG. 4 illustrates tiling operations involved in processing (denoising) a high-resolution input image 405, in accordance with one or more embodiments. The input image 405 is segmented into multiple input tiles 415. Each of these input tiles 415 comprises 8×8 pixels, initially shown as a grid corresponding to the input image 405, and corresponds to an individual 8×8 core tile 420 for parallel processing.

In the depicted embodiment, each of the core tiles 420 is subsequently processed to form a padded tile 425. In particular, each 8×8 core tile 420 is surrounded by a border of padding pixels, thereby forming a larger, 16×16 padded tile. In certain embodiments, information for the padding pixels of each padded tile 425 is taken from the corresponding pixels adjacent to those of the respective core tile 420.

In certain embodiments, padding data for border tiles (core tiles that are located at the border of the input image 405) is generated by mirroring the image data from the respective core tile 420 itself, ensuring a smooth transition between the core/padding pixels and thereby maintaining continuity of the image data. The padded tiles 425 are subjected to processing, and resulting output padded tiles are extracted from the output padding as output core tiles 497, which are then reassembled to generate the output image 499.

FIG. 4 additionally depicts two examples of alternative tiling configurations. First, an 18×18 padded tile 425-2 is depicted, in which a core tile of 14×14 pixels is surrounded by a 2-pixel padding layer on each side. Second, a 20×20 padded tile 425-3 is illustrated, which comprises a 16×16 pixel core tile with a 2-pixel padding layer on all sides. These examples underline the flexibility of the tiling process, allowing for adjustments in core tile and padding size parameters. Thus, in various embodiments, various parameters of a tiled denoising CNN model such as core tile size, padding size, and network size can be varied to suit specific use cases. Moreover, in various embodiments, multiple U-Nets may be utilized to execute operations of a tiled denoising CNN, such as with various quantities of encoder/decoder layers.

Figure 5:
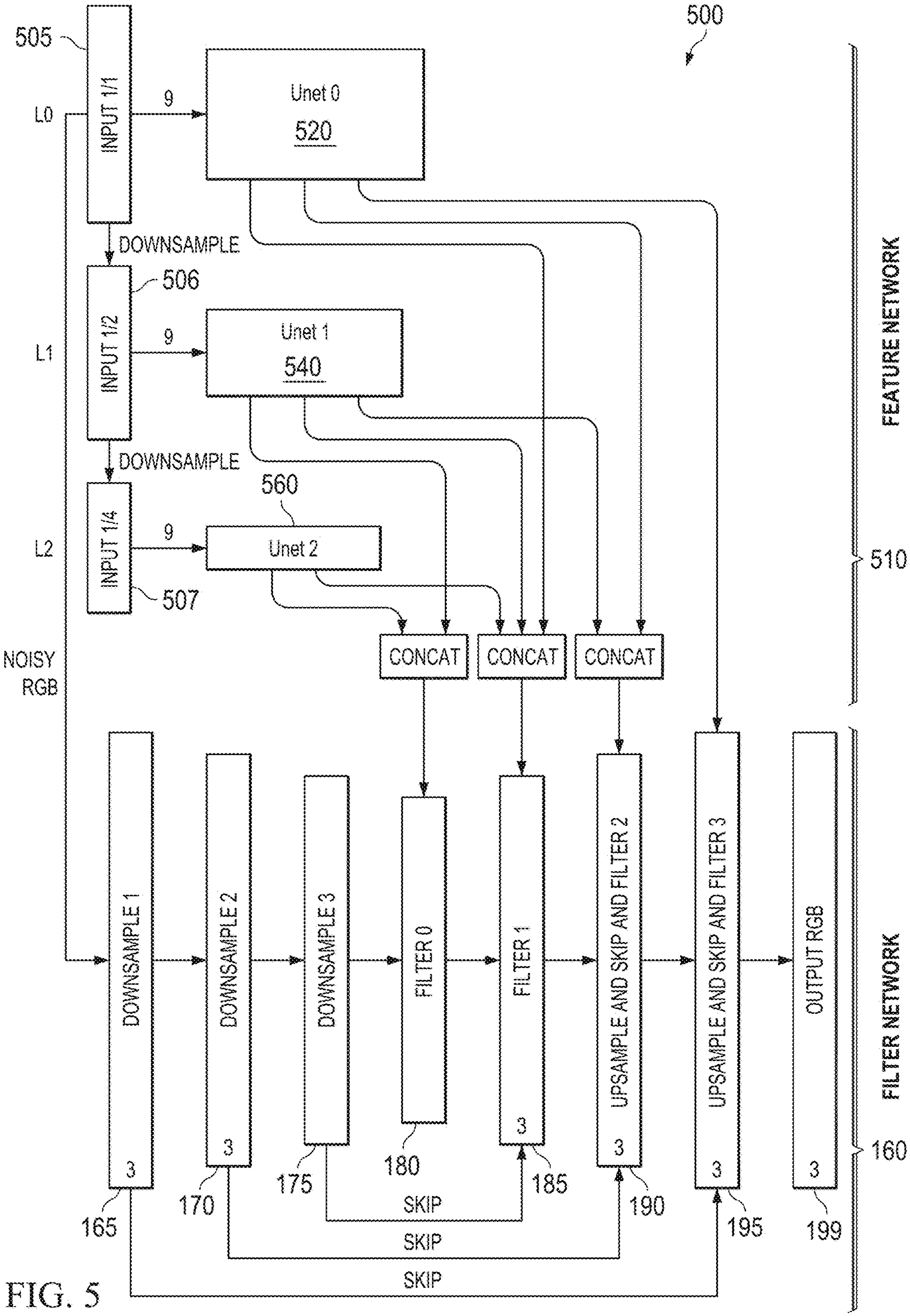
FIG. 5 illustrates a tiled denoising CNN in accordance with one or more embodiments.

FIG. 5 illustrates a tiled denoising CNN 500 in accordance with one or more embodiments. In the depicted embodiment, the tiled denoising CNN 500 includes a feature network 510 that comprises three distinct U-Net structures 520, 540, 560. In the depicted embodiment, the tiled denoising CNN 500 operates on an original input image data 505 and successively downsampled versions thereof to perform denoising operations.

Input image data 505 is provided as input to a first U-Net 520, described in greater detail below with respect to FIG. 6. The first U-Net 520 is configured to perform various operations (e.g., convolutional transformations, nonlinear activation functions, and pooling operations for the extraction and learning of high-resolution image features) on the full-resolution input image data 505. Concurrently, that input image data 505 is downsampled to generate half-resolution input data 506. The downsampled half-resolution input data 506 is provided as input to a second U-Net 540, which performs similar operations on that half-resolution input image data 506. Notably, the U-Net 540 independently partitions the input data 506 into tiles, such that it takes as input a full-size tile from downsampled input 506, rather than a downsampled tile of input 505.

The half-resolution input data 506 is subjected to an additional downsampling operation to yield a quarter-resolution input data 507. This quarter-resolution input data 507 is then provided as input to a third U-Net 560. As similarly noted above with respect to the U-Net 540, the U-Net 560 independently partitions the input data 507 into tiles, such that it takes as input a full-sized tile from downsampled input 507 rather than a downsampled tile of input data 506. Thus, each of the U-Nets 520, 540, 560 operates on a different level of resolution, thereby creating a multi-resolution processing scheme. This approach effectively multiplies the size of the receptive field of the tiled denoising CNN 500, relative to a network comprising a single U-Net.

In the depicted embodiment of FIG. 5, the feature network 510 is coupled to filter network 160 (as illustrated in FIG. 1), such that the original input image data 505 is provided as an input to the initial downsampling block 165 of the filter network 160, and such that each of filter blocks 180, 185, 190, 195 receives as input the output of one or more of the U-Nets 520, 540, 560.

The filter block 180 is fed with the concatenated outputs from the second U-Net 540 and the third U-Net 560. This arrangement leverages the features learned at both half-resolution and quarter-resolution levels. However, in certain embodiments, the described tiling approach may be applied to only one or more U-Nets comprising the feature network, while full-resolution input is provided to the filter network. Such an approach may still improve performance, as the computational costs of the filter network associated with such embodiments generally comprises a small portion (e.g., approximately 10%) of those of the entire network.

In the depicted embodiment, the filter block 185 receives as input the concatenated outputs of all three U-Nets 520, 540, 560, thereby incorporating information from full-resolution, half-resolution, and quarter-resolution levels.

The filter block 190 takes as input the concatenated outputs of the first U-Net 520 and the second U-Net 540, incorporating information from both full-resolution and half-resolution levels.

Lastly, the final filter block 195 receives as input the output of the first U-Net 520, corresponding to the highest resolution level.

In this manner, the tiled denoising CNN 500 is capable of effectively processing input image data at multiple resolutions, leveraging the specific features learned at each level to provide an enhanced denoised output.

Figure 6:
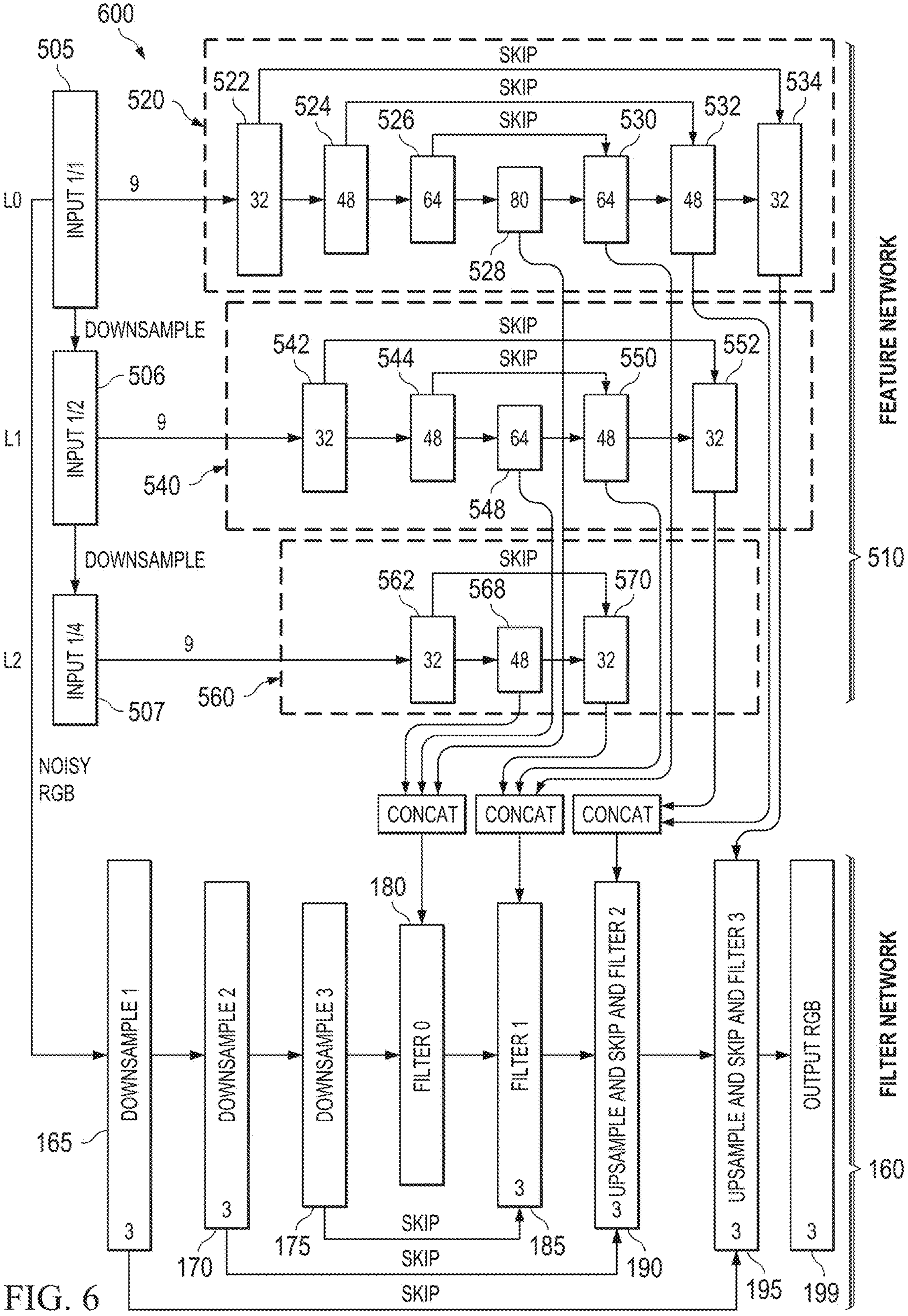
FIG. 6 illustrates an expanded view of a tiled denoising CNN in accordance with some embodiments.

FIG. 6 illustrates an expanded view of the tiled denoising CNN 500 in accordance with some embodiments. The CNN 500 is structurally similar to that depicted in FIG. 5, with the distinction that each of the U-Nets 520, 540, 560 is here expanded to depict its individual encoding and decoding stages.

The first U-Net 520 includes encoder blocks 522, 524, and 526, which sequentially process the full-resolution input data. The encoder blocks 522, 524, 526 output their results to a bottleneck 528, where the higher-level features are concentrated in a manner similar to that described elsewhere herein with respect to bottleneck 135 of FIG. 1. The condensed feature information from the bottleneck 528 is then provided to decoder blocks 530, 532, and 534 for progressive upsampling and extraction of detailed features.

Similarly, the second U-Net 540 comprises encoder blocks 542, 544, followed by bottleneck 548 and then decoder blocks 550, 552. The encoder and decoder blocks in U-Net 540 process the half-resolution input data 506, respectively condensing and expanding the feature information.

The third U-Net 560 processes the quarter-resolution input data 507, and includes an encoder block 562, a bottleneck 568, and a decoder block 570. The single encoder and decoder blocks in U-Net 560 reflect the lower complexity required for processing the lower-resolution input data.

In this expanded depiction, the feature network 510 interfaces with the filter network 160, as originally depicted in FIG. 1. In particular, the filter block 180 receives as its input the concatenated outputs from each of the bottlenecks 528, 548, and 568; the upsample/skip/filter (USF) block 185 is fed with the concatenated outputs of the decoder blocks 530, 550, and 570; the USF block 190 receives concatenated outputs from the decoder blocks 532 and 552; and USF block 195 is supplied with the output of decoder block 534.

Figure 7:
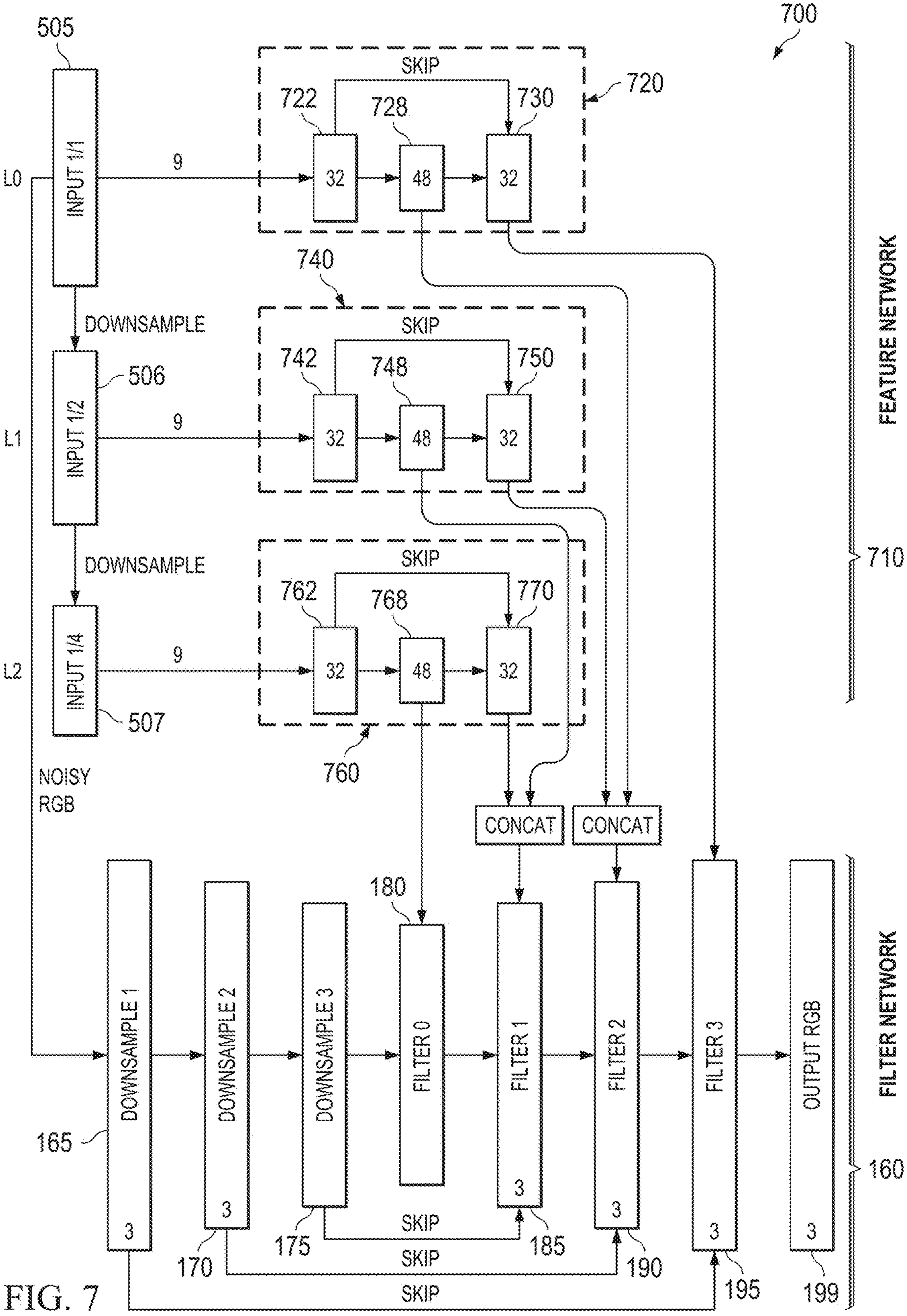
FIG. 7 illustrates another implementation of a tiled denoising CNN in accordance with some embodiments.

FIG. 7 illustrates a tiled denoising CNN 700 in accordance with some embodiments. The CNN 700 includes a feature network 710 that again comprises three U-Nets 720, 740, and 760. However, in contrast to embodiments discussed above, each of these U-Nets is structurally similar to the third U-Net 560 depicted in FIG. 6, as they each include a single encoding block, a bottleneck, and a decoding block.

In particular, the U-Net 720 includes an encoding block 722 that takes the full-resolution input data 505 and generates a condensed feature representation. This output is then passed to the bottleneck 728 for further high-level feature condensation. Following this, the output from the bottleneck 728 is sent to the decoding block 730, which performs upsampling and detailed feature extraction. Similarly, the second U-Net 740 includes an encoding block 742, a bottleneck 748, and a decoding block 750, which each respectively process the half-resolution input data 506. The third U-Net 760 includes an encoding block 762, a bottleneck 768, and a decoding block 770, and processes the quarter-resolution input data 507.

The feature network 710 is communicatively coupled to the filter network 160, as described elsewhere herein. In the depicted embodiment, filter block 180 receives the output from the bottleneck 768. The upsample/skip/filter (USF) block 185 takes as input the concatenated outputs from the decoding block 770 and the bottleneck 748. In addition, USF block 190 receives concatenated inputs from decoding block 750 and bottleneck 728. Finally, the output from decoding block 730 is provided to USF block 195.

Figure 8:
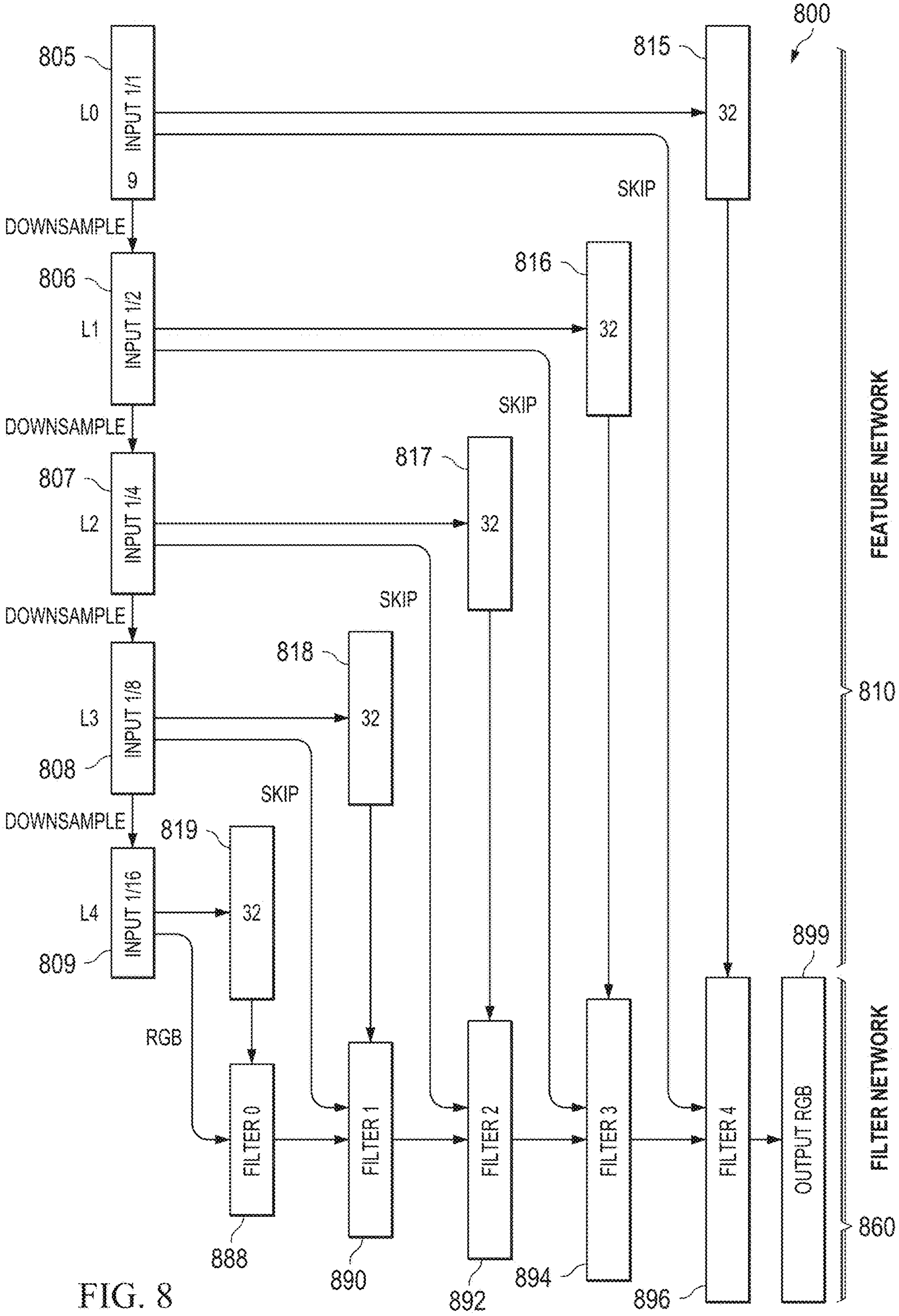
FIG. 8 illustrates another representation of a tiled denoising CNN in accordance with some embodiments.

FIG. 8 illustrates a tiled denoising CNN 800 in accordance with some embodiments. In this embodiment, original image input data 805 is systematically downsampled in successive stages to generate half-resolution input data 806, quarter-resolution input data 807, eighth-resolution input data 808, and finally sixteenth-resolution input data 809, all of which are collectively referenced herein as data inputs 805-809.

The tiled denoising CNN 800 includes a feature network 810 that includes a series of single 32-channel processing blocks 815, 816, 817, 818, and 819, each of which is specifically assigned to process one of the data inputs 805-809. In particular, the processing block 815 processes original image input data 805, processing block 816 processes the half-resolution input data 806, processing block 817 processes the quarter-resolution input data 807, processing block 818 processes the eighth-resolution input data 808, and the processing block 819 handles the sixteenth-resolution input data 809.

The CNN 800 also includes a filter network 860, which includes a series of filter blocks 888, 890, 892, 894, and 896. Filter block 888 receives input from the sixteenth-resolution input data 809 and processing block 819. The subsequent filter block 890 accepts input from filter block 888, a skip connection from the eighth-resolution input data 808, and the output of processing block 818. Following this, filter block 892 is fed input from filter block 890, a skip connection from the quarter-resolution input data 807, and the output of processing block 817. Filter block 894 receives input from filter block 892, a skip connection from the half-resolution input data 806, and the output of processing block 816. Lastly, filter block 896 receives input from filter block 894, a skip connection from the original input data 805, and the output from processing block 815. The output of filter block 896 is produced as output RGB data 899, denoting the denoised final image output.

Figure 9:
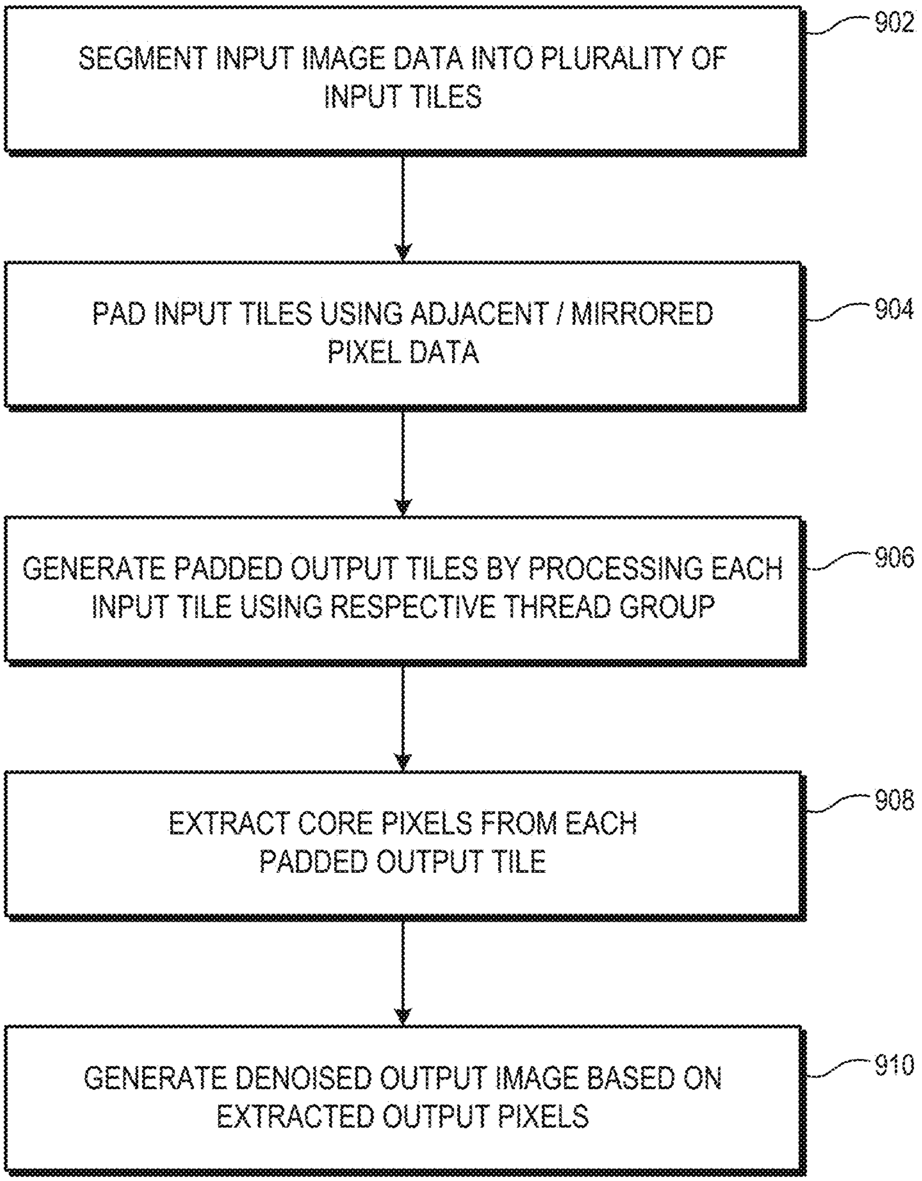
FIG. 9 illustrates an operational flow diagram for an operational routine of a tiled denoising CNN, in accordance with one or more embodiments.

FIG. 9 illustrates an operational flow diagram for an operational routine 900 of a tiled denoising CNN in accordance with one or more embodiments. The operational routine 900 may be performed, for example, by one of tiled denoising CNNs 500, 600, 700, 800 as respectively described above with respect to FIGS. 5, 6, 7, 8.

The routine begins at 902, in which the tiled denoising CNN segments input image data representing an original input image into a multitude of input tiles. In certain embodiments, the input image data being segmented in this manner also includes associated Arbitrary Output Variable (AOV) information, as discussed elsewhere herein. The routine proceeds to 904.

At 904, each of the segmented input tiles is padded using data associated with one or more pixels adjacent to each input tile. In certain embodiments, for input tiles located along a border of the original input image, padding includes generating one or more padding pixels based on one or more pixels of the input tile. The routine proceeds to 906.

At 906, each padded input tile is processed using a respective thread group, which leads to the generation of output tiles. This processing operation includes employing one or more U-Nets, which in various embodiments includes one or more encoding stages and one or more decoding stages. As discussed in greater detail elsewhere herein, each encoding stage transforms the input data of the input tile into a representation with reduced spatial dimensions, while each decoding stage transforms the input data into a representation with increased spatial dimensions.

In certain embodiments, and as discussed in greater detail elsewhere herein, the processing of the multitude of input tiles may utilize operations of multiple U-Nets that are configured together to form a feature network (e.g., one of feature networks 510, 710, 810, as described above with respect to FIGS. 5, 7, and 8). The output of this feature network is processed through a filter network, leading to the generation of output tiles. In certain embodiments, each U-Net within the tiled denoising CNN operates on an input tile representation having a specific resolution. Moreover, in certain embodiments the processing of the input tiles may also involve providing the filter network with input comprising concatenated outputs from multiple such U-Nets. In certain embodiments, the operation of each thread group is designed to involve a single read from system memory and a single write back to the system memory. The routine proceeds to 908.

At 908, the tiled denoising CNN extracts a set of core pixels from each padded output tile, such as by excluding output pixels corresponding to the padding pixels that were added to the input tiles in step 904. The routine proceeds to 910.

At 910, the tiled denoising CNN generates a denoised output image (e.g., by assembling the denoised output image based on a spatial position corresponding to that of each original input tile) using the extracted core pixels.

It will be appreciated that advantageously, in certain embodiments only a single read operation from the system memory and a single write operation to the system memory are employed during the processing of each input tile. In this manner, the operational routine 900 efficiently denoises the input image using a tiled denoising CNN with significantly reduced operations involving system memory, as described in greater detail elsewhere herein.

FIG. 10 is a block diagram of a processing system 1000 designed to implement a tiled denoising CNN (e.g., one of tiled denoising CNNs 500, 600, 700, 800 as respectively described above with respect to FIGS. 5, 6, 7, 8) in accordance with one or more embodiments. The processing system 1000 is generally designed to execute sets of instructions or commands to carry out tasks on behalf of an electronic device, such as a desktop computer, laptop computer, server, smartphone, tablet, game console, and the like.

The processing system 1000 includes or has access to a memory 1005 or other storage component that is implemented using a non-transitory computer readable medium, such as dynamic random access memory (DRAM). The processing system 1000 also includes a bus 1010 to support communication between entities implemented in the processing system 1000, such as the memory 1005. In certain embodiments, the processing system 1000 includes other buses, bridges, switches, routers, and the like, which are not shown in FIG. 10 in the interest of clarity.

The processing system 1000 includes one or more parallel processors 1015 that are configured to render images for presentation on a display 1020. A parallel processor is a processor that is able to execute a single instruction on multiple data or threads in a parallel manner. Examples of parallel processors include graphics processing units (GPUs), massively parallel processors, single instruction multiple data (SIMD) architecture processors, and single instruction multiple thread (SIMT) architecture processors for performing graphics, machine intelligence, or compute operations. The parallel processor 1015 can render objects to produce pixel values that are provided to the display 1020. In some implementations, parallel processors are separate devices that are included as part of a computer. In other implementations such as advance processor units, parallel processors are included in a single device along with a host processor such as a central processor unit (CPU). Thus, although embodiments described herein may utilize a graphics processing unit (GPU) for illustration purposes, various embodiments and implementations are applicable to other types of parallel processors.

In certain embodiments, the parallel processor 1015 is also used for general-purpose computing. For instance, the parallel processor 1015 can be used to implement machine learning algorithms such as one or more implementations of a tiled denoising CNN as described herein. In some cases, operations of multiple parallel processors 1015 are coordinated to execute a machine learning algorithm, such as if a single parallel processor 1015 does not possess enough processing power to run the machine learning algorithm on its own.

The parallel processor 1015 implements multiple processing elements (also referred to as compute units) 1025 that are configured to execute instructions concurrently or in parallel. The parallel processor 1015 also includes an internal (or on-chip) memory 1030 that includes a local data store (LDS), as well as caches, registers, or buffers utilized by the compute units 1025. The parallel processor 1015 can execute instructions stored in the memory 1005 and store information in the memory 1005 such as the results of the executed instructions. The parallel processor 1015 also includes a command processor 1040 that receives task requests and dispatches tasks to one or more of the compute units 1025.

The processing system 1000 also includes a central processing unit (CPU) 1045 that is connected to the bus 1010 and communicates with the parallel processor 1015 and the memory 1005 via the bus 1010. The CPU 1045 implements multiple processing elements (also referred to as processor cores) 1050 that are configured to execute instructions concurrently or in parallel. The CPU 1045 can execute instructions such as program code 1055 stored in the memory 1005 and the CPU 1045 can store information in the memory 1005 such as the results of the executed instructions.

An input/output (I/O) engine 1060 handles input or output operations associated with the display 1020, as well as other elements of the processing system 1000 such as keyboards, mice, printers, external disks, and the like. The I/O engine 1060 is coupled to the bus 1010 so that the I/O engine 1060 communicates with the memory 1005, the parallel processor 1015, or the CPU 1045.

In operation, the CPU 1045 issues commands to the parallel processor 1015 to initiate processing of a kernel that represents the program instructions that are executed by the parallel processor 1015. Multiple instances of the kernel, referred to herein as threads or work items, are executed concurrently or in parallel using subsets of the compute units 1025. In some embodiments, the threads execute according to single-instruction-multiple-data (SIMD) protocols so that each thread executes the same instruction on different data. The threads are collected into workgroups (also termed thread groups) that are executed on different compute units 1025. For example, the command processor 1040 can receive these commands and schedule tasks for execution on the compute units 1025.

In some embodiments, the parallel processor 1015 implements a graphics pipeline that includes multiple stages configured for concurrent processing of different primitives in response to a draw call. Stages of the graphics pipeline in the parallel processor 1015 can concurrently process different primitives generated by an application, such as a video game. When geometry is submitted to the graphics pipeline, hardware state settings are chosen to define a state of the graphics pipeline. Examples of state include rasterizer state, a blend state, a depth stencil state, a primitive topology type of the submitted geometry, and the shaders (e.g., vertex shader, domain shader, geometry shader, hull shader, pixel shader, and the like) that are used to render the scene.

In various embodiments, each segmented tile of an input image is processed in parallel by the compute units 1025 in the parallel processor 1015. This allows for efficient denoising of images without excessive read/write operations to/from the system memory 1005. Thus, implementations of tiled CNN-based denoising can therefore significantly improve output image quality in a wide range of devices and applications.

In some embodiments, the apparatus and techniques described above are implemented in a system including one or more integrated circuit (IC) devices (also referred to as integrated circuit packages or microchips), such as the tiled denoising CNN described above with reference to FIGS. 3-10. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of denoising an input image, the method comprising:

segmenting input image data representing the input image into a plurality of input tiles;

generating a corresponding plurality of output tiles by concurrently processing each of the plurality of input tiles using a respective thread group, each respective thread group employing a U-Net comprising one or more encoding stages and one or more decoding stages;

extracting a set of core pixels from each output tile of the plurality of output tiles; and generating a denoised output image using the extracted core pixels.

2. The method of claim 1, wherein each encoding stage transforms input data representing the input tile into a representation of the input tile with reduced spatial dimensions, and wherein each decoding stage transforms input data representing the input tile into a representation of the input tile with increased spatial dimensions.

3. The method of claim 1, wherein each encoding stage and each decoding stage comprises a respective quantity of output channels, and wherein each U-Net includes a bottleneck that comprises a greater quantity of output channels than any respective one of the one or more encoding and decoding stages of the U-Net.

4. The method of claim 1, wherein segmenting the original input image into the plurality of input tiles comprises padding each of the plurality of input tiles using data associated with one or more pixels adjacent to each input tile.

5. The method of claim 4, wherein for each of one or more input tiles located along a border of the original input image, padding the input tile includes generating one or more padding pixels based on one or more pixels of the input tile.

6. The method of claim 1, wherein processing each of the input tiles using a respective thread group comprises a single read operation from system memory and a single write operation to system memory.

7. The method of claim 1, wherein each U-Net is configured to form a feature network and process the output of the feature network through a filter network to generate an output tile.

8. The method of claim 7, wherein each U-Net operates on an input tile generated based on a representation of the input image having a different respective resolution.

9. The method of claim 7, wherein processing each of the plurality of input tiles comprises providing input to the filter network that comprises concatenated outputs from multiple U-Nets.

10. The method of claim 1, wherein the original input image data includes associated Arbitrary Output Variable (AOV) information, and wherein processing each of the plurality of input tiles comprises processing at least some of the AOV information.

11. A non-transitory computer readable medium embodying a set of executable instructions that, when executed by one or more processors, causes the one or more processors to:

segment input image data representing the input image into a plurality of input tiles;

generate a corresponding plurality of output tiles by concurrently processing each of the plurality of input tiles using a respective thread group, wherein each respective thread group employs a U-Net comprising one or more encoding stages and one or more decoding stages;

extract a set of core pixels from each output tile of the plurality of output tiles; and generate a denoised output image using the extracted core pixels.

12. A system for denoising an input image, the system comprising:

segmentation circuitry configured to segment input image data representing the input image into a plurality of input tiles;

processing circuitry configured to process each of the input tiles using a respective thread group, each thread group employing a U-Net comprising one or more encoding stages and one or more decoding stages, to generate a corresponding plurality of output tiles;

extraction circuitry configured to extract a set of core pixels from each output tile of the plurality of output tiles; and image generation circuitry configured to generate a denoised output image using the extracted core pixels.

13. The system of claim 12, further comprising padding circuitry configured to pad each of the plurality of input tiles using data associated with one or more pixels adjacent to each input tile.

14. The system of claim 13 wherein, for each of one or more input tiles located along a border of the original input image, the padding circuitry is configured to generate one or more padding pixels based on one or more pixels of the input tile.

15. The system of claim 12, wherein each encoding stage of the U-Net transforms input data representing a respective input tile into a representation of the input tile with reduced spatial dimensions, and wherein each decoding stage transforms input data representing the respective input tile into a representation of the input tile with increased spatial dimensions.

16. The system of claim 12, wherein each encoding stage and each decoding stage of the U-Net comprises a respective quantity of output channels, and wherein the U-Net includes a bottleneck comprising a greater quantity of output channels than any respective one of the one or more encoding and decoding stages.

17. The system of claim 12, wherein the processing circuitry is configured to execute a single read operation from system memory and a single write operation to system memory for each input tile.

18. The system of claim 12, wherein each U-Net is configured to form a feature network and to process the output of the feature network through a filter network to generate an output tile.

19. The system of claim 18, wherein each U-Net operates on an input tile generated based on a representation of the input image having a different respective resolution.

20. The system of claim 18, wherein the processing circuitry is configured to provide input to the filter network that comprises concatenated outputs from multiple U-Nets.

* * * * *